United States Patent
Tu et al.

(10) Patent No.: US 8,498,454 B2
(45) Date of Patent: Jul. 30, 2013

(54) OPTIMAL SUBSPACES FOR FACE RECOGNITION

(75) Inventors: Jilin Tu, Schenectady, NY (US);
Frederick Wilson Wheeler, Niskayuna, NY (US); Peter Henry Tu, Niskayuna, NY (US); Xiaoming Liu, Schenectady, NY (US); Yan Tong, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 911 days.

(21) Appl. No.: 12/627,039

(22) Filed: Nov. 30, 2009

(65) Prior Publication Data
US 2011/0013845 A1 Jan. 20, 2011

Related U.S. Application Data

(60) Provisional application No. 61/225,262, filed on Jul. 14, 2009.

(51) Int. Cl.
*G06K 9/00* (2006.01)

(52) U.S. Cl.
USPC .................... 382/118; 382/209; 382/218

(58) Field of Classification Search
USPC ............................ 382/118, 209, 218
See application file for complete search history.

(56) References Cited

U.S. PATENT DOCUMENTS

| | | | | |
|---|---|---|---|---|
| 6,259,815 | B1* | 7/2001 | Anderson et al. | 382/218 |
| 7,106,891 | B2* | 9/2006 | Wyman et al. | 382/128 |
| 7,450,766 | B2* | 11/2008 | Luo | 382/224 |
| 7,454,062 | B2 | 11/2008 | Nishiyama et al. | |
| 7,471,833 | B2 | 12/2008 | Skarbek et al. | |
| 7,472,096 | B2* | 12/2008 | Burges et al. | 706/20 |
| 7,502,495 | B2 | 3/2009 | Zhang et al. | |
| 7,738,705 | B2* | 6/2010 | Casadei | 382/181 |
| 8,189,855 | B2* | 5/2012 | Opalach et al. | 382/100 |
| 8,233,702 | B2* | 7/2012 | Gokturk et al. | 382/155 |
| 2007/0094171 | A1* | 4/2007 | Burges et al. | 706/16 |
| 2008/0126031 | A1* | 5/2008 | Azarbayejani et al. | 703/2 |
| 2008/0256130 | A1 | 10/2008 | Kirby et al. | |
| 2009/0063307 | A1* | 3/2009 | Groenovelt et al. | 705/28 |
| 2010/0049675 | A1* | 2/2010 | Ning et al. | 706/12 |

OTHER PUBLICATIONS

Wang et al., Modeling and Predicting Face Recognition System Performance Based on Analysis of Similarity Scores, 2007, IEEE.*
Shuicheng Yan, Dong Xu and Xiaoou Tang; "Face Verification With Balanced Thresholds"; IEEE Transactions on Image Processing, vol. 16, No. 1, Jan. 2007; 7 Pages.
Dahua Lin, Shuicheng Yan and Xiaoou Tang; "Feedback-based Dynamic Generalized LDA for Face Recognition"; 0-7803-9134-9/05/$20.00 © 2005 IEEE; 4 Pages.
Jilin Tu, Frederick Wilson Wheeler, Peter Henry Tu, Xiaoming Liu and Yan Tong; "Optimal Subspaces for Face Recognition"; U.S. Appl. No. 61/225,262, filed Jul. 14, 2009; 13 Pages.

* cited by examiner

*Primary Examiner* — John Strege
(74) *Attorney, Agent, or Firm* — Joseph J. Christian (57) ABSTRACT

A technique for optimizing object recognition is disclosed. The technique includes receiving at least one image of an object and at least one reference image. The technique further includes identifying at least one performance metric corresponding to an object recognition task. The identified performance metric is optimized to generate the corresponding optimized performance metric by determining an optimal subspace based on a determined objective function corresponding to the object recognition task and a difference between the received image and the corresponding reference image. Subsequently, the technique includes comparing the received image with the reference image based on the optimized performance metric for performing the object recognition task.

22 Claims, 5 Drawing Sheets

OPTIMAL SUBSPACES FOR FACE RECOGNITION

CROSS REFERENCE TO RELATED APPLICATIONS

This non-provisional application relates to and claims the benefit of priority under 35 U.S.C. §119(e) to U.S. Provisional Patent Application Ser. No. 61/225,262, filed Jul. 14, 2009, which is herein incorporated in its entirety by reference.

STATEMENT REGARDING FEDERALLY SPONSORED RESEARCH & DEVELOPMENT

This invention was made with Government support under contract number 2007-DE-BX-K191 awarded by The US Department of Justice. The Government has certain rights in the invention.

BACKGROUND

Embodiments of the present invention relate generally to digital image processing and more particularly to image processing techniques that employ computer vision for optimizing object recognition.

Object recognition techniques are widely applied in medical image analysis, industrial machine vision systems, security and authentication applications, biometric systems, and so on, for recognizing objects using acquired image data. Particularly, object recognition is used in present day biometric applications for protecting electronically stored information and for identifying and authenticating individuals. Face recognition, being a non-contact biometric technique, provides a competitive and convenient technique for identifying individuals. A core challenge for face recognition techniques, however, is to derive a feature representation of facial images that facilitates accurate identification. To that end, conventional subspace training face recognition algorithms are employed to provide better face recognition performance. These algorithms project facial images into lower dimension subspaces that preserve intrinsic properties of the acquired image data, thereby enhancing face recognition performance scores.

Some of the subspace training algorithms, such as Principal Component Analysis (PCA) and Independent Component Analysis (ICA) focus on finding subspaces that preserve distributive properties of acquired image data. Other subspace training algorithms, such as Fisher Discriminant Analysis (FDA), Locality Preserving Projections (LPP), and Marginal Fisher Analysis (MFA) preserve the discriminative or locality properties of the acquired image data. Generally, the discriminative or locality properties align well with the face recognition performance scores. These properties, however, may lead to suboptimal subspaces when the image data does not satisfy one or more assumptions such as those concerning intrapersonal variations and imaging conditions. In a real-world application, such as in an ID kiosk face verification application, a query image and a set of reference images are acquired in different settings. Statistical incoherence between the query image and the set of reference images on account of different imaging conditions considerably affects subspace determination capability, thus resulting in inefficient face recognition performance.

Furthermore, many face recognition techniques employ a large number of features to enhance the face recognition performance. Employing such a large number of features along with a determined amount of training data, however, considerably increases the computational burden on a training system, thereby affecting face recognition results. Consequently, conventional subspace training algorithms employ fewer features, thereby imposing limitations on further improvements to the face recognition performance.

It may therefore be desirable to develop efficient techniques that improve the face recognition performance by determining optimal subspaces. Further, there is a need for techniques that provide efficient computations that result in better recognition performance even with a limited number of features or training data.

BRIEF DESCRIPTION

In accordance with an aspect of the present technique, a system for object recognition is described. The system includes an image capture device for acquiring at least one image of an object. The system further includes a computing device communicatively coupled to the image capture device for receiving at least one image of an object and at least one reference image. Additionally, the computing device identifies at least one performance metric corresponding to an object recognition task. The computing device further optimizes the identified performance metric to generate the corresponding optimized performance metric by determining an optimal subspace based on a determined objective function corresponding to the object recognition task and a difference between the received image and the corresponding reference image. Subsequently, the computing device compares the received image with the reference image based on the optimized performance metric for performing the object recognition task.

In accordance with a further aspect of the present technique, a computerized method for optimizing object recognition is presented. The method includes receiving at least one image of an object and at least one reference image. Further, at least one performance metric corresponding to an object recognition task is identified using a computing device. Subsequently, the identified performance metric is optimized to generate the corresponding optimized performance metric by determining an optimal subspace based on a determined objective function corresponding to the object recognition task and a difference between the received image and the corresponding reference image. The method further includes comparing the received image with the reference image based on the optimized performance metric for performing the object recognition task using the computing device.

In accordance with another aspect of the present technique, a computerized method for optimizing object recognition is described. The method includes receiving at least one image of an object and at least one reference image. Additionally, the method identifies at least one performance metric corresponding to an object recognition task using a computing device. The method further optimizes the identified performance metrics to generate the corresponding optimized performance metric for determining an optimal subspace. The optimization of the identified performance metrics is based on a gradient descent optimization method in which a cost step function corresponding to the gradient descent optimization method is replaced with a sigmoid function, an exponential function, a linear transform, or a combination thereof. The optimization is further based on a difference between the at least one received image and the corresponding reference image. Subsequently, the method includes comparing the received image with the reference image based on the optimized performance metric for performing the object recognition task using the computing device.

In accordance with yet another aspect of the present technique, a screening system is described. The screening system includes an image acquisition device for acquiring at least one image corresponding to an object. The screening system further includes an object recognition unit, communicatively coupled to the image acquisition device, for receiving at least one image of an object and at least one reference image and identifying at least one performance metric corresponding to an object recognition task. Additionally, the object recognition unit optimizes the identified performance metric to generate the corresponding optimized performance metric by determining an optimal subspace based on a determined objective function corresponding to the object recognition task and a difference between the received image and the corresponding reference image. The screening system also includes an image processor communicatively coupled to the image acquisition device and the object recognition unit for comparing the received image with the reference image based on the optimized performance metric for performing the object recognition task using the computing device.

In accordance with a further aspect of the present technique, a computer program product stored on a computer readable medium for optimizing face recognition is presented. The computer readable medium includes program code for acquiring at least one image of an object and at least one reference image and identifying at least one performance metric corresponding to an object recognition task using a computing device. The computer readable medium further includes program code for optimizing the identified performance metric to generate the corresponding optimized performance metric by determining an optimal subspace based on a determined objective function corresponding to the object recognition task and a difference between the received image and the corresponding reference image. Additionally, the computer readable medium includes program code for comparing the received image with the reference image based on the optimized performance metric for performing the object recognition task using the computing device.

DRAWINGS

These and other features, aspects, and advantages of the present technique will become better understood when the following detailed description is read with reference to the accompanying drawings in which like characters represent like parts throughout the drawings, wherein.

DETAILED DESCRIPTION

The following description presents a technique for optimizing object recognition. Embodiments illustrated hereinafter disclose a plurality of computerized methods, systems and a computer program product capable of directly optimizing one or more performance metrics corresponding to an object recognition task. Particularly, the disclosed systems and methods directly optimize the performance metrics by determining an optimal subspace corresponding to the object recognition task using a customized gradient descent technique. By further accounting for a determined difference between an acquired image and one or more corresponding reference images due to different imaging conditions, the present technique is able to substantially enhance recognition performance of different object recognition techniques.

Although the present technique is described with reference to face recognition, implementation of the disclosed technique in recognizing various other objects, such as a person, apparel, luggage, merchandise, an animal, a vehicle, a biometric parameter, or combinations thereof, is also contemplated. An exemplary environment suitable for practicing various implementations of the present technique is discussed in the following sections with reference to FIG. 1.

Figure 1:
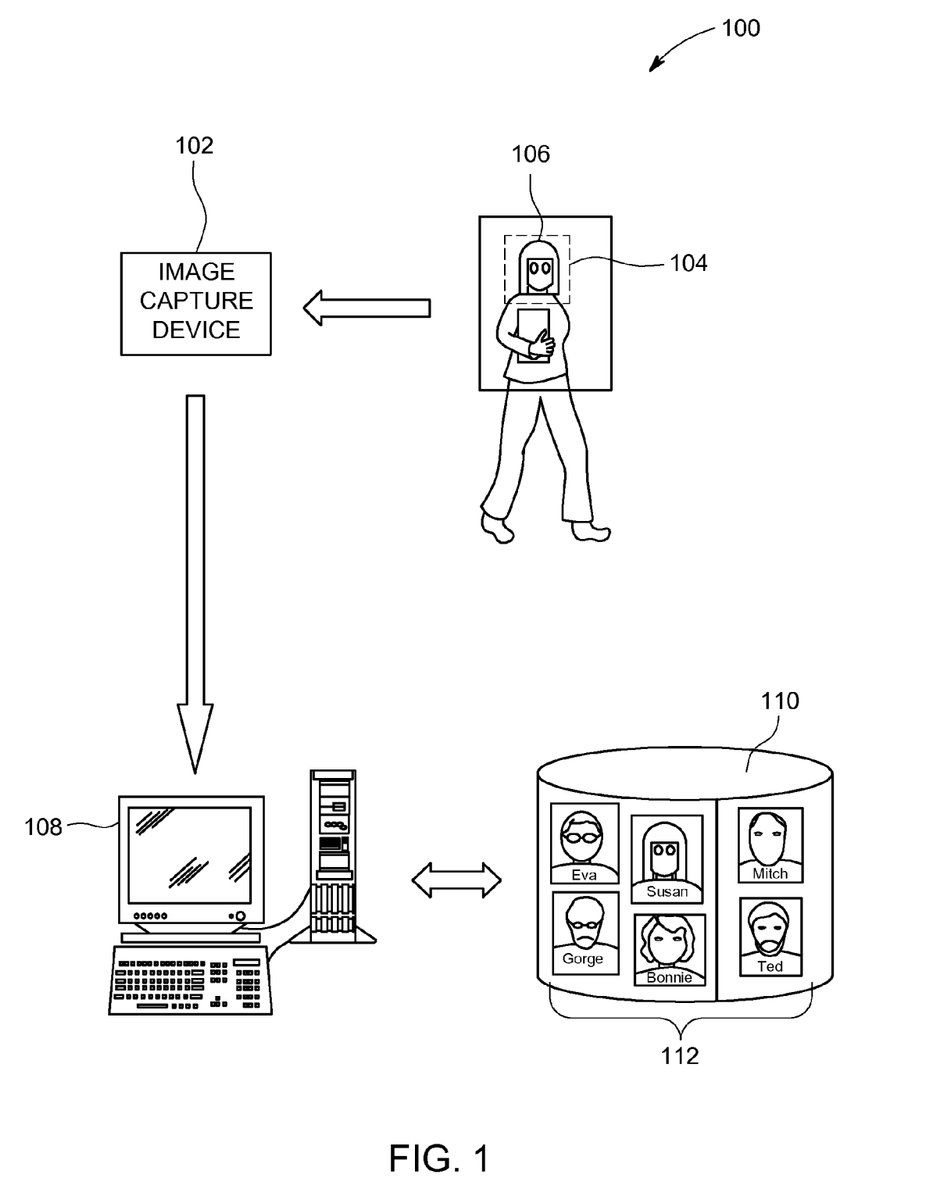
FIG. 1 is a pictorial view of a system for optimizing object recognition, in accordance with aspects of the present technique.

FIG. 1 illustrates an exemplary system 100 for optimizing a face recognition task. In one embodiment, the system 100 may include an image capture device 102 for capturing at least one facial image 104 of a person 106. The image capture device 102 includes, for example, a scanner, a camera, an image sensor, a webcam, or combinations thereof. The system 100 may further include a computing device 108 operatively coupled to the image capture device 102 for processing the facial image 104. The computing device 108 includes, for example, a server, a desktop computer, a laptop, a mobile computing device, and so on. In one embodiment, the computing device 108 may further be coupled to a data repository 110 that stores the facial image 104 and a set of reference images 112. Typically, the facial image 104 and the set of reference images 112 are collected in different settings or imaging conditions. In an ID kiosk application, for example, the image capture device 102 positioned within the ID kiosk captures the facial image 104 in limited lighting. The set of reference images 112, however, may have been captured using a high quality camera employing better lighting conditions. Further, the facial image 104 and the set of reference images 112, thus captured, may include 2D gray-scale images, color images, or 3D range data images. Moreover, in some embodiments, the set of reference images 112 may include more than one reference image corresponding to images of the person 106 acquired in different imaging conditions.

According to aspects of the present technique, the computing device 108 may analyze the facial image 104 for performing one or more face recognition tasks such as a face verification task, a face identification task, or a combination thereof. It may be noted that a performance goal corresponding to the face verification task may relate to verifying whether the acquired facial image 104 and at least one of the set of reference images 112 correspond to the same person 106. A performance goal corresponding to the face identification task, however, may relate to discovering an identity of the facial image 104 based on a comparison with the set of reference images 112 that include facial images with known identities. Thus, different face recognition tasks focus on different performance goals. The computing device 108, therefore, may identify one or more performance metrics that affect the performance goals corresponding to a particular face recognition task and devise a rigorous mathematical formulation for the corresponding performance goals. In one embodiment, the data repository 110 coupled to the computing device 108 may be employed to store the one or more performance metrics and the devised mathematical formulation corresponding to each face recognition task.

In accordance with aspects of the present technique, the mathematical formulation corresponding to each face recognition task enables the computing device 108 to determine at least one subspace for optimizing the one or more performance metrics corresponding to a specific face recognition task. To that end, the computing device 108 may identify an optimal subspace by employing a gradient descent optimization method for enhancing the performance metrics. Particularly, the computing device 108 may be employed to customize the gradient descent optimization method for determining the optimal subspace by replacing a cost step function associated with the gradient descent function with a sigmoid function, an exponential function, a linear transform, or combinations thereof. This customization subdues outliers in the acquired image data, improves robustness and results in faster optimization.

In some embodiments, the computing device 108 may further customize the gradient descent optimization method based on a determined difference between the facial image 104 and the set of reference images 112. This difference between the facial image 104 and the set of reference images 112 is typically on account of different lighting conditions, image capture angles, resolution of the image capture device 102, and so on. Subsequently, the computing device 108 may optimize the face recognition task by employing the customized gradient descent optimization method to identify the optimal subspace for evaluating the facial image 104 in relation to the set of reference images 112. A method for determining and optimizing the subspace for directly enhancing the one or more performance metrics corresponding to the face recognition task will be described in greater detail with reference to FIGS. 2-5.

Figure 2:
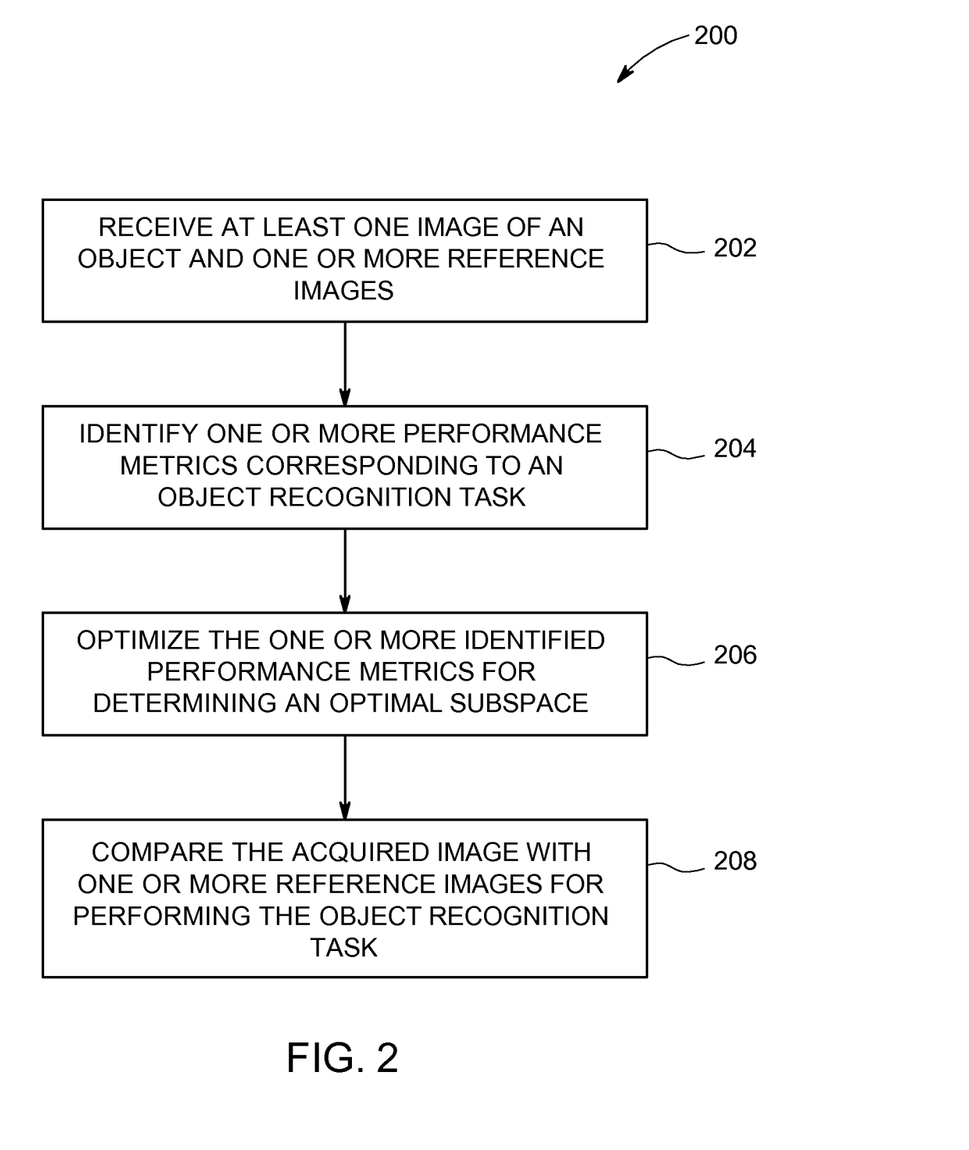
FIG. 2 is a flowchart depicting an exemplary method of optimizing object recognition, in accordance with aspects of the present technique.
Figure 3:
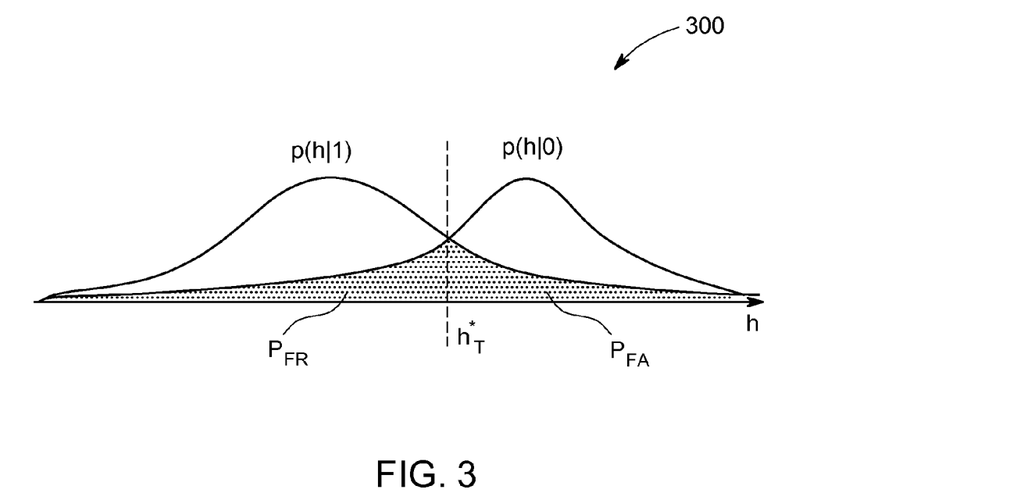
FIG. 3 is a graph depicting a probability of verification error employed for measuring face verification performance, in accordance with aspects of the present technique.

FIG. 2 illustrates a flowchart 200 depicting an exemplary method for optimizing a face recognition task by optimizing one or more performance metrics corresponding to the face recognition task. The method may be described in a general context of computer executable instructions. Generally, computer executable instructions may include routines, programs, objects, components, data structures, procedures, modules, functions, and the like that perform particular functions or implement particular abstract data types. Further, in FIG. 2, the method is illustrated as a collection of blocks in a logical flow graph, which represents a sequence of operations that may be implemented in hardware, software, or combinations thereof. The various operations are depicted in the blocks to illustrate functions that are performed generally during the identification of performance metrics, determination of optimal subspaces, and optimization of a face recognition task, in accordance with aspects of the present technique. The order in which the method is described is not intended to be construed as a limitation, and any number of the described blocks may be combined in any order to implement the method disclosed herein, or an equivalent alternative method. Additionally, individual blocks may be deleted from the method without departing from the spirit and scope of the subject matter described herein. For discussion purposes, the method is described with reference to the implementations of FIG. 1.

The method begins at step 202 when at least one image of an object and one or more reference images are received. In the present example, the object may include the facial image 104 of the person 106 (see FIG. 1), whereas the one or more reference images may include the set of reference images 112 as illustrated in FIG. 1. In certain embodiments, either or both of the facial image 104 and the set of reference images 112 are received from the image capture device 102, the computing device 108 or the data repository 110 (see FIG. 1). The received images are analyzed to perform a particular face recognition task. As noted previously, the face recognition task includes a face verification task, a face identification task, or a combination thereof. In one embodiment, out of face image pairs used for the face verification task, a first image is received from a target gallery set and a second image is received from a probe set representing identity ground truths. Typically, the gallery set is a set of target face images for comparison such as the set of reference images 112, whereas the probe set is a set of query face images for comparison such as the facial image 104. Further, the identity ground truths define person identity ground truths for the face images in the gallery set and the probe set. Thus, given the target gallery set and the probe set of query face images with identity ground truths, the face verification and the face identification performance can be evaluated by comparing recognition results against the ground truths.

Particularly, for face identification, the identity ground truth of the gallery set may be known to the system 100 (see FIG. 1). In one embodiment, identities of the probe face images may be obtained by finding the closest match in the gallery set. The identification is successful if the obtained identity of a probe face image is equal to the corresponding probe identity ground truth. Furthermore, the face identification performance may be defined by an identification rate (IR), which is a determined percentage of correct identifications over all images in the probe set.

For face verification, however, the system 100 evaluates whether a face image in the gallery set and a face image from the probe set are from the same person or not. The verification is successful if the obtained verification result is equal to the identity ground truth match of the pair of gallery and probe image. Further, the face verification performance may be based on a probability of a verification error (PE). Assuming a uniform probability of a face image of each person being present in the gallery set, PE is defined as an average of a false alarm rate (FAR) and a false rejection rate (FRR). FAR is a determined probability of wrongly generating an alarm by declaring face image pairs from the same person as being from different persons. FRR, however, is a determined probability of wrongly rejecting an alarm by declaring face image pairs from different persons as being from the same person. Evaluation of the IR and the PE indicate that performance metrics corresponding to different face recognition tasks, such as face identification and face verification, are different.

According to aspects of the present technique, the performance metrics corresponding to a particular face recognition task may be identified by devising an objective function corresponding to a rigorous mathematical formulation for one or more performance goals relating to the particular face recognition task as depicted by step 204. An exemplary method for devising the objective function is described in the following sections. A table providing a list of notations employed throughout the description of the method is presented herein below.

TABLE 1

Notation

| | |
|---|---|
| C | The number of subjects |
| \|S\| | The number of facial images in a set S |
| P | $\{X1, X2, \ldots, X\|P\| \| X \in R^d, \|P\| > C\}$, the probe set |
| I | $\{I1, I2, \ldots, I\|P\| \| I \in [1, 2, \ldots, C]\}$, the probe identity ground truth |
| G | $\{Y1, Y2, \ldots, Y\|G\| \| Y \in R^d, \|G\| > C\}$, the gallery set |
| J | $\{J1, J2, \ldots, J\|G\| \| J \in [1, 2, \ldots, C]\}$, the gallery identity list |
| Id(X) | The ground truth identity of a facial image X, i.e., $I_k = Id(X_k)$, $X_k \in P$; $J_k = Id(Y_k)$, $Y_k \in G$ |
| $S^I$ | $\{X \| X \in S, Id(X) = I\}$, subset of images in the set S with identity I. $S \in \{G, P\}$. |
| $S^{-I}$ | $\{X \| X \in S, Id(X) \neq I\}$, subset of images in S with identities other than I |
| A | A subspace. $x = AX$, $y = AY$, $\forall X \in P, Y \in G$. $(x, y \in R^t, t \leq d)$ |
| $S_A$ | $S_A = AS$, projection of a set S into subspace A |
| h(x, y) | Distance between sample x and sample y |
| h(x, G) | $h(x, y^*) = \min\{h(x, y) \| y \in G\}$, the distance from a probe sample x to a gallery set G |

In one embodiment, a typical close-set face recognition task for C subjects may be considered, where each subject has at least one image in the gallery set G and at least one image in the probe set P, the gallery and probe images forming an image pair currently being examined. Given a subspace A and a verification decision threshold $h_T$, face verification may be carried out by comparing the distance between the image pair in the subspace A against the threshold $h_T$. Further, the FAR and FRR evaluated over the data set $\{P, G\}$ can be defined as:

$$FAR = \frac{\sum_{x \in P_A} \sum_{y \in G_A^{Id(x)}} f(h(x, y) - h_T)}{\sum_{x \in PA} |G_A^{Id(x)}|} \quad (1)$$

$$FRR = \frac{\sum_{x \in P_A} \sum_{y \in G_A^{Id(x)}} f(h_T - h(x, y))}{\sum_{x \in PA} |G_A^{-Id(x)}|} \quad (2)$$

where the error penalty function $f(u)$ is a step function defined as:

$$f(u) = \prod(u) = \begin{cases} 0, & \text{if } u < 0 \\ 1, & \text{if } u \geq 0 \end{cases} \quad (3)$$

In embodiments including multiple exemplary gallery images for the same person 106, face verification may be performed by comparing the probe face image against the most similar gallery image of the person 106. The FAR therefore, may be re-defined as:

$$FAR = \frac{\sum_{x \in P_A} f(h(x, G_A^{Id(x)}) - h_T)}{|P_A|} \quad (4)$$

Moreover, the verification error rate may be formulated as $$PE = \frac{FAR + FRR}{2} \quad (5)$$

Further, in case of a face identification task, the identification rate (IR) may be formulated as:

$$IR = \frac{1}{|PA|} \sum_{x \in P_A} f(h(x, G_A^{-Id(x)}) - h(x, G_A^{Id(x)})) \quad (6)$$

Equation 6 assumes that the gallery and probe images of the person 106 are not interchangeable. Such an assumption is made because typically the gallery and probe images are collected at different instances of time and under different imaging conditions in real world applications. Equation 6, therefore, accounts for the statistical incoherences between the gallery and probe images.

Typically, for face recognition tasks, conventional subspace learning algorithms determine a subspace where distance distribution of image pairs from different persons (p(h|0)) and the distance distribution of image pairs from the same person (p(h|1)) are maximally separated. The separation, however, may not be characterized by a minimized PE. Additionally, it may be desirable to make certain assumptions about the image data. For example, the image data may be assumed to have a Gaussian distribution, manifold smoothness and so on which may not always be true for real-world applications. Therefore, an optimal threshold $h^*_T$ may be determined such that the verification error PE is minimized. The minimization of the verification error PE is depicted by a graph 300 illustrated in FIG. 3.

In case of face identification, the probe image x from the subject C is correctly identified by finding the closest match in the gallery set G. By way of an example, given a probe image x from subject C (according to the probe ground truth), the following equation may be employed to define that the distance from the probe image x to the gallery images of subject C ($y \in G^C$) is smaller than that between x and the gallery images from subjects that are not C ($z \in G^{-C}$).

$$\{h(x,y)|y \in G^C\} < \min\{h(x,z)|z \in G^{-C}\} \quad (7)$$

Thus, the closest match from x to the gallery set may yield the correct identification result, that is, the identity of image x is C. a prior possibility of a probe image being actually from person c [P(c)|c=1, 2, . . . C] is uniform and the distance distributions p(h|0) and p(h|1) are independent, the face identification process may be considered to be an approximation to the M-ary Orthogonal Signal Demodulation in telecommunication. Therefore, the identification rate may be defined as:

$$IR = \sum_C P(C) \int_{x \in P^C} P\left\{\bigcap_{\substack{y \in G^C \\ z \in G^{-C}}} [h(x, z) > h(x, y)] \mid C\right\} \quad (8)$$

$$dx \sim \int_{-\infty}^{\infty} p(h|1) \left(\int_h^{\infty} p(g|0) \, dg\right)^{C-1} dh =$$

$$\int_{-\infty}^{\infty} p(h|1)(1 - P_{FR}(h))^{C-1} dh.$$

Equation 8 indicates the relation between the face verification performance scores and the face identification performance scores based on a complicated integration process. Particularly, the equation 8 indicates that PE→0 and IR→1 when p(h|0) and p(h|1) are separated by $P_{FR}$(h)=0 for (p(h|1) #0, ∀h). Further, the equation 8 shows that IR is a decreasing function of the number of subjects C in the gallery set. Thus, given a discriminative subspace with the same PE, the manner in which the IR degenerates with respect to increasing C is dependent on how p(h|0) and p(h|1) overlap.

Figure 4:
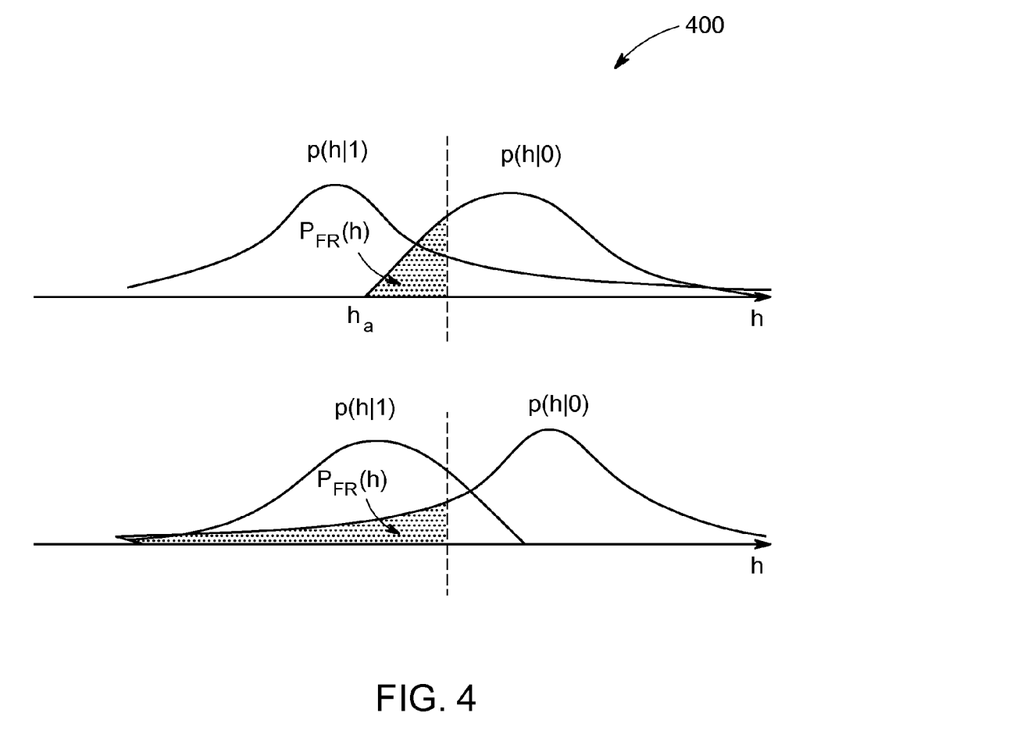
FIG. 4 is a graph depicting a distance distribution of image pairs corresponding to different persons as compared to image pairs corresponding to the same person used for determining face identification performance, in accordance with aspects of the present technique.

FIG. 4, for example, illustrates a graph 400 depicting the symmetrically switched distance distributions p(h|0) and p(h|1) that yield the same optimal face verification performance (PE). The illustrated p(h|0) and p(h|1) distributions, however, will produce different IRs when C is large.

This difference in IRs indicates that face identification performance may not be optimal in a subspace where the data distribution is maximally separated, which may be in contrast to optimal data distribution required for the face verification task. Further, the pattern of the data distribution overlap may play an important role in the face identification performance. Thus, different face recognition tasks such as face verification and face identification include different performance goals, and therefore may depict optimum performance in different subspaces. Equations 1-8 provide one or more performance metrics that need to be optimized for different performance goals corresponding to different face recognition tasks.

With returning reference to FIG. 2, once the performance metrics corresponding to each face recognition task have been determined, at step 206, a subspace for optimizing the performance metrics may be determined. In one embodiment, a gradient descent optimization method is employed for optimizing the performance metrics. According to aspects of the present technique, optimal subspaces for the face verification task and the face identification task may be achieved by optimizing the PE and the IR, respectively. Further, given a training set, the optimal subspace A* and decision threshold $h^*_T$ that minimize PE for face verification may be obtained as:

$$(A^*, h_T^*) = \arg\min_{A, h_T}\{PE\}, \quad (9)$$

where PE is defined by any combination of the Equations 1-4 based on the training set. In one embodiment, the training set may be a set of gallery and probe images with identity ground truths. The methods described herein below aim to optimize performance scores on the training set, and find a corresponding optimal subspace A* for the training set. Further another set of gallery and probe data set that include face images with person identities different from the training set may be employed as a testing set for evaluating the performance of the subspace A* on a different set of gallery and probe images. By way of example, given the subspace A* optimal for the performance scores on the training set, a subspace A* based face recognizer may be applied to the testing set to evaluate the face verification and identification performance. The application of the face recognizer may be used to evaluate whether the face recognizer based on the optimal subspace A* may be generalized to a testing set that is different from the training set.

Similarly the optimal subspace A* that maximizes IR for face identification may be obtained as:

$$A^* = \arg\max_A\{IR\}, \quad (10)$$

where IR is defined by the Equation 6.

Such performance optimization on the training set may be analyzed and generalized to the testing data.

However, as the PE and the IR are not differentiable, a cost step function $f(.)$ corresponding to the gradient descent optimization method may be replaced by a sigmoid function or an exponential function for enabling optimization of the performance metrics. In one embodiment, the sigmoid function may be represented as:

$$f(u) = \frac{1}{1 + e^{-u/\sigma}} \quad (11)$$

$$\text{with } \frac{\partial f}{\partial u} = \frac{1}{\sigma} f(u)(1 - f(u)); F(u) \to \prod(u)$$

for $\sigma \to 0$

The differentiable sigmoid function subdues outliers in the data and improves robustness of a face recognition technique. Particularly, the sigmoid function is employed as an approximation of the function $f(.)$ when sigma approaches infinity.

Similarly, the exponential function may be represented as:

$$f(u) = e^{u/\sigma} \quad (12)$$

$$\text{with } \frac{\partial f}{\partial u} = \frac{1}{\sigma} f(u)$$

The differentiable exponential function puts increasing penalty on the classification errors if sigma approaches zero. If the data contains no outliers, this function results in faster optimization.

Subsequently, the PE and the IR are differentiated by employing the chain rule of differentiation. Particularly, once $$\frac{\partial h(x, y)}{\partial A} = \frac{\partial h(AX, AY)}{\partial A} \quad (13)$$

is defined, $$\frac{\partial PE(A, h_T)}{\partial A, h_T} \quad (14)$$

$$\text{and } \frac{\partial IR(A)}{\partial A} \quad (15)$$

may be calculated. Further, on a defining the distance metric as a Euclidean distance, the following equation, in which the colon operator ':' stands for the vectorization of a matrix, may be applicable:

$$\frac{\partial h(AX, AY)}{\partial A} = \frac{\partial}{\partial A}\|AX - AY\|^2 = 2(A(X-Y)(X-Y)^t)^t \quad (16)$$

Alternatively, for correlation based distance measure, the following equation may be applicable.

$$\frac{\partial h(AX, AY)}{\partial A} = \frac{\partial}{\partial A}\left\{1 - \frac{X^t A^t AY}{\sqrt{X^t A^t AY}\sqrt{Y^t A^t AX}}\right\} \quad (17)$$

$$= \left\{\frac{a_{XY} AXX^t}{a_x^3 a_y} + \frac{a_{XY} AYY^t}{a_x a_y^3} - \frac{A(YX^t + XY^t)}{a_x a_y}\right\} : T,$$

where $a_x = \sqrt{X^T A^T AX}$, $a_y = \sqrt{Y^T A^T AY}$, and $a_{XY} = X^T A^T AY$.

Once equations 14-15 are determined, the subspaces for the performance metrics, for example, the PE and the IR corresponding to face verification and face identification, respectively may be optimized by employing gradient descent optimization methods. Methods for optimizing a subspace for face verification and face identification will be discussed in greater detail in the following sections.

Figure 5:
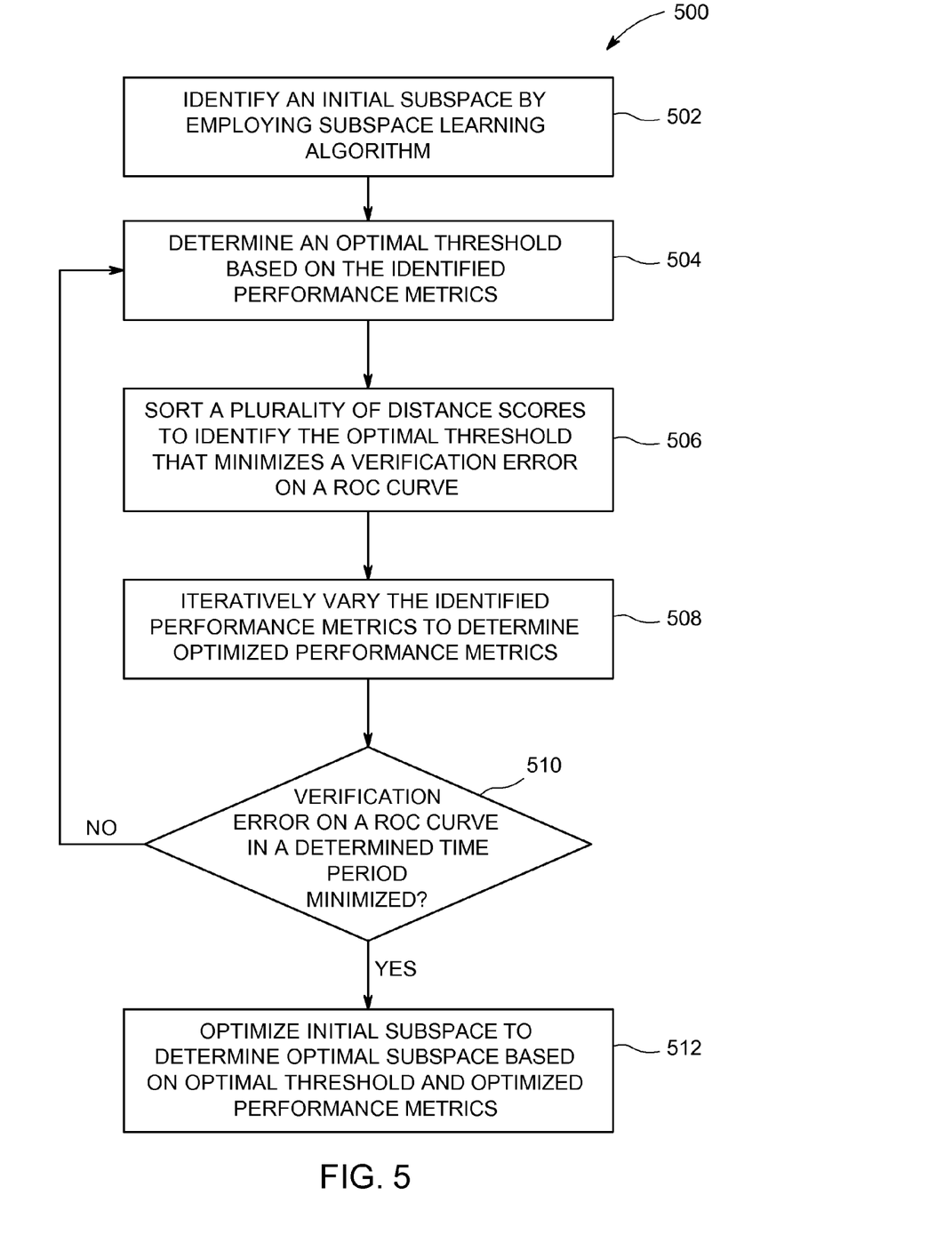
FIG. 5 is a flowchart depicting an exemplary method of optimizing subspaces for object recognition, in accordance with aspects of the present technique.

FIG. 5 illustrates a flowchart 500 depicting an exemplary method for determining and optimizing subspaces for face verification. At step 502, an initial subspace for optimizing face verification is determined based on input images from a probe set and a gallery set corresponding to a set of training images. The initial subspace A and an optimal threshold $h_T$ are determined by iteratively optimizing the face verification score PE. In one embodiment, an initial candidate $A_0$ for the initial subspace A may be obtained using a conventional subspace learning algorithm, such as LDA, LPP, MFA, and so on. Additionally, the parameter sigma ($\sigma$) for a cost step function $f(.)$ corresponding to the gradient descent optimization method may be initialized with a large sigma value, and is gradually reduced to a smaller sigma value in a fashion similar to simulated annealing. The gradual reduction of the parameter sigma enables the gradient search on the cost step function to be initially performed on a smoothed cost surface. In one embodiment, PE/IR may be obtained by a cumulative sum of the cost step function $f(.)$ whose steepness is controlled by the parameter sigma. Thus, an appropriate sigma value may be used to ensure that PE/IR defines a smooth cost surface in a parameter coordinate system spanned by the subspace A. The gradient search on the cost step function performed on the smooth cost surface increases the chance of guiding the optimization towards global minima.

The following algorithm 1 depicts steps of an exemplary method for determining an optimal subspace for face verification:

---
Algorithm 1 (P, I, G, J, A0)
---

Initialize $\sigma = \sigma_1$
A = A0
while A has not converged do
$h_T \leftarrow$ func_opt_thres($P_A$, I, $G_A$, J).

$$A \leftarrow A - \alpha \frac{\partial PE(A, h_T)}{\partial A}.$$

if $\sigma > \sigma_\in$ then
$\sigma \leftarrow \beta\sigma, \{0 < \beta < 1\}$.
end if
end while

---

Further, at step 504, the decision threshold hT is optimized by employing a gradient descent technique that varies one or more parameters defining a receiver operating characteristic (ROC) curve. The ROC curve is a plot showing a relation between the FAR and the PE and may be generated by using Equation 6. In one embodiment, the following algorithm 2 may be employed for obtaining the globally optimal decision threshold:

---
Algorithm 2 (PA, I, GA, J)
---

Compute pairwise face match scores H = {h(x, y) | x ∈ $P_A$, y ∈ $G_A$}, |H| = |$P_A$| × |$G_A$|.
Obtain pairwise match ground-truth G = {δ(Id(x) − Id(y)) | x ∈ $P_A$, y ∈ $G_A$, Id(x) ∈ I, Id(y) ∈ J}, where δ(u) = 1 i.f.f. u = 0.
Obtain $H_{sorted}$ by sorting H in a descending order; and obtain $G_{sorted}$ by rearranging G according to the sorting order
Compute sequential false alarm rate FAR as a cumulative sum of the sequence $G_{sorted}$ ---
Algorithm 2 (PA, I, GA, J)
---

Compute sequential true rejection rate TRR = 1-FRR as a cumulative sum of 1-$G_{sorted}$.

Normalize FAR $\leftarrow \frac{FAR}{\sum G}$, TRR $\leftarrow \frac{TRR}{\sum (1-G)}$.

Obtain sequential error rates PE = $\frac{FAR + 1 - TRR}{2}$, which corresponds to the sorted decision thresholds in $H_{sorted}$ Obtain index $i^* \leftarrow$ arg min(PE).
$h_T^* \leftarrow H_{sorted}(i^*)$
return $h_T^*$.

---

Subsequently, at step 506, the method may sort a plurality of distance scores to obtain a decision threshold. In an embodiment including n image pairs for performance evaluation, sorting the distance scores enables an efficient generation of the ROC curve. Minimizing verification error on the ROC curve is a direct way to optimize the performance of a face verification system as the optimization is not based on any typical assumptions regarding data distribution, and so on, as is the case in conventional subspace learning algorithms. In order to minimize the verification error, the identified performance metrics are varied iteratively at step 508 to determine the corresponding optimal performance metrics. Accordingly, at step 510, the method determines if the verification error on the determined ROC curve is minimized in a selected time period. If the verification error is not minimized, control may be transferred to step 504. If the verification error is minimized, the value of the decision threshold is determined to be representative of an optimal threshold that minimizes the verification error on the ROC curve in a particular time period, as indicated by step 512. Thus, the initial subspace is optimized to determine a corresponding optimal subspace based on the determined optimal threshold and optimized performance metrics corresponding to the face verification task. In case of face identification, however, the differentiation of the IR is performed during evaluation of the IR as illustrated in Equation. 6, because the gradients are accumulated only from the gallery image of each object that is closest to the probe image, that is, $$\frac{\partial h(x, G^I)}{\partial A} = \frac{\partial h(x, y^*)}{\partial A}, y^* = \text{argmin}\{h(x, y) \mid y \in G^I\} \quad (18)$$

The following algorithm 3 depicts steps of an exemplary method for determining an optimal subspace for face identification:

---
Algorithm 3 (P, I, G, J, A0)
---

Initialize $\sigma = \sigma_1$
A = $A_0$ . A has not converged do $$A = A + \alpha \frac{\partial IR}{\partial A}$$

if $\sigma > \sigma_\in$ then
$\sigma \leftarrow \beta\sigma, \{0 < \beta < 1\}$.
end if
end while
return A.

With returning reference to step 206 of FIG. 2, the following equation may be employed to conveniently parameterize a range of a suitable for optimization and independent of a magnitude of data variations:

$$[\sigma_e, \sigma_1] = [\gamma_e, \gamma_1] \times \text{median}(\{h(x,y) | x \in P_{A_0}, y \in G_{A_0}\}) \quad (19)$$

The equation 19 enables a user to choose appropriate control parameters $[\gamma_z, \gamma_1]$ for emphasis on better generalization capability when the training data is sparse and includes no outliers. Alternatively, the definition enables a user to choose the control parameters $[\gamma_z, \gamma_1]$ for better robustness when the training data includes a large number of outliers. Particularly, if the cost step function $f(.)$ includes the sigmoid function, the control parameters $[\gamma_z, \gamma_1]$ may be assigned the values 0.001 and 0.03, respectively. Alternatively, if the cost step function $f(.)$ includes the exponential function, the following values may be employed $\gamma = \gamma_z = \gamma_1 = 0.2$. Thus, employing differentiable sigmoid or exponential functions enables determination of an optimal subspace associated with the performance metrics corresponding to each face recognition task.

Subsequent to subspace optimization, at step 208, the acquired facial image 104 may be compared with the set of reference images 112 for performing a desired face recognition task. Particularly, each face recognition task may be performed by directly employing the corresponding optimized performance metrics. Additionally, as the disclosed method takes into consideration an intrinsic incoherence between the gallery images and the probe images of the same subject caused by the data collection procedures in real-world applications, a substantial improvement in the recognition performance may be achieved.

Figure 6:
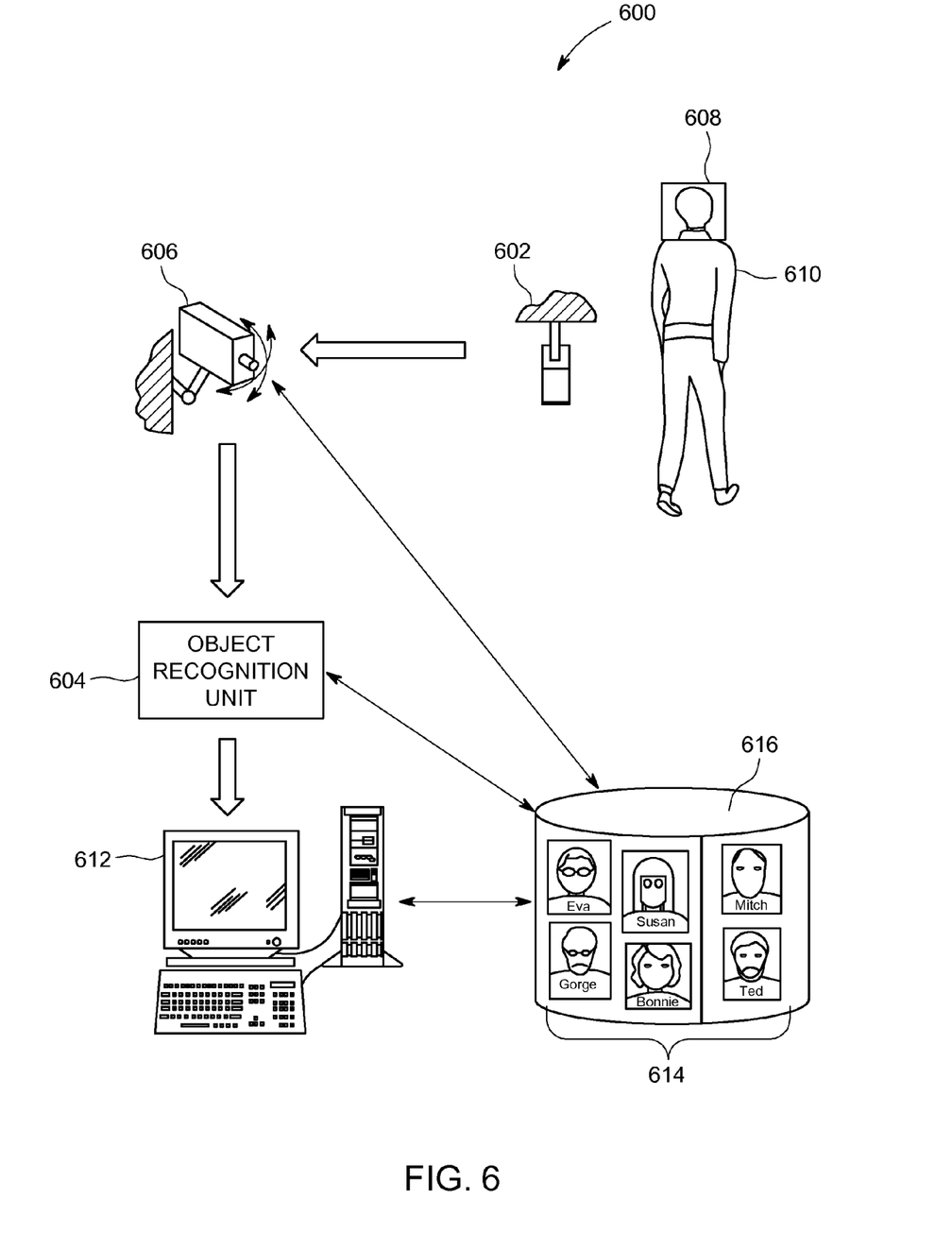
FIG. 6 is a pictorial view of a screening system for optimizing face recognition, in accordance with aspects of the present technique.

FIG. 6 illustrates an exemplary real-world application depicting a screening system 600 that optimizes face recognition. The system 600 may be implemented at an airport security checkpoint 602 for speeding up a check-in process and greatly reducing workload of the airport security officers. In one embodiment, the system 600 may include an object recognition unit 604 coupled to an image acquisition device 606 configured to capture at least one facial image 608 of a person 610 requesting entry at the security checkpoint 602. The system 600 may further include an image processor 612 coupled to the object recognition unit 604 for processing the captured facial image 608. The image processor 612 may include one or more microprocessors, microcomputers, microcontrollers, dual core processors, and so forth. In one embodiment, the image processor 612 may automatically verify the identity of the person 610 substantially in real-time by comparing the facial image 608 captured by the image acquisition device 606 with at least one reference image 614. The reference image 614, in one embodiment, is scanned from a government issued ID card, such as a driver license. Alternatively, the reference image 614, along with the captured facial image 608 may be stored and accessed from a data repository 616 coupled to the image processor 612.

Similarly, one or more captured facial images and reference images corresponding to a plurality of persons may be stored in the data repository 616. Typically, the captured facial image 608 and the reference image 614 include large appearance variations due to different imaging conditions such as illumination, aging, pose, and facial expression during image capture. Particularly, the reference image 614 may include artifacts on the face such as a seal or textured waveforms overlaid by the ID card. These artifacts, thus, pose additional difficulties to the face recognition task. In order to mitigate the difficulties faced during the face recognition tasks, the system 600 undergoes training on a set of images. To that end, the set of images may be divided into a training set and a testing set with non-overlapped person identity. Division of images into sets with non-overlapped person identity may be achieved, for example, if there are face images of a person with ID A, B, C, and D, these face images are divided into a training set and a testing set as AB/CD or A/BCD or ABC/D, and so on. In a further embodiment, the image processor 612 may downsize the images for faster processing. While downsizing the images, the image processor 612 may also perform anti-aliasing filtering to remove the textured waveforms that generally include high frequency information.

Optionally, the object recognition unit 604 may apply one or more conventional subspace learning algorithms such as LPP and FDA to the filtered images to learn the models from the training data. Subsequently, the face verification performances of the conventional subspace learning algorithms may be evaluated on the testing data. By varying the number of dimensions of subspaces from about 30 to about 600, the object recognition unit 604 may determine the lowest PE on the testing set for each algorithm with respect to the subspace dimension number. It may be noted that, typically, it takes an average of four seconds for a human subject to evaluate an image pair, and the average PE corresponding to human inspection is about 22.6%. The conventional subspace learning algorithms such as LPP and FDA, however, fail to substantially improve on the performance of the human subject due to the existence of large amount of outliers in the face image data.

Accordingly, the object recognition unit 604 may employ the method as discussed with reference to FIG. 2 to optimize the different face recognition tasks. As there exist substantial outliers and illumination variations in the face image data, in one embodiment, the cost step function $f(.)$ may be defined to be a sigmoid function that employs normalized correlation based distance metric.

Further, the object recognition unit 604 may also optimize the different face recognition tasks by directly employing one or more performance metrics corresponding to the face recognition task. Particularly, the object recognition unit 604 may be configured to identify the one or more performance metrics corresponding to each face recognition task. The object recognition unit 604 is further configured to determine at least one subspace for optimizing each the one or more performance metrics. As noted previously with reference to FIGS. 2-5, the object recognition unit 604 may devise a rigorous mathematical formulation corresponding to the one or more performance metrics. The mathematical formulation, among other factors, may take into account a determined difference between the captured facial image 608 and the reference image 614 due to different imaging conditions. Based on the mathematical formulation, the object recognition unit 604 determines a subspace that optimizes the performance metrics corresponding to the face recognition task.

Subsequently, the image processor 612 performs the optimized face recognition task by using the optimized performance metrics. Thus, the proposed method can further improve the performance of conventional subspace learning algorithms on both the training set and the testing set. Particularly, by customizing the algorithm design for each face recognition task and accounting for the incoherence in the gallery and probe images, the performance of the existing subspace training face recognition algorithm may be further improved. It is further determined that employing the method 200 for optimizing face recognition tasks reduces the PE to 19% which is 3.9% better than the performance of the human subject. Therefore, optimizing the performance metrics corresponding to each object recognition task directly by employing optimized gradient descent methods, as described herein, substantially enhances the recognition performance of an object recognition technique.

Although the exemplary embodiments in the present technique are described in the context of subspace training for face recognition, the technique may be used in many different operating environments and systems. For example, the disclosed embodiments may be used for optimizing recognition of biometric parameters such as an iris, an ear, a fingerprint, a voice identifier, or combinations thereof. Further, extending the application of the disclosed embodiments in systems using boosting algorithms and support vector machines is also contemplated.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A computerized method for optimizing object recognition, comprising:
  receiving at least one image of an object and at least one reference image;
  identifying at least one performance metric corresponding to an object recognition task using a computing device, wherein the object recognition task comprises an object verification task, an object identification task, or a combination thereof;
  optimizing the identified performance metric to generate the corresponding optimized performance metric by determining an optimal subspace based on a determined objective function corresponding to the object recognition task and a difference between the received image and the corresponding reference image, wherein optimizing the identified performance metric for determining the optimal subspace corresponding to one or more of the object verification task and the object identification task comprises:
    identifying an initial subspace by employing a subspace learning algorithm;
    iteratively varying the identified performance metric to determine the corresponding optimized performance metric; and
    optimizing the initial subspace to determine the optimal subspace based on the optimized performance metric; and
  comparing the received image with the reference image based on the optimized performance metric for performing the object recognition task using the computing device.

2. The method of claim 1, wherein determining an optimal subspace for optimizing the identified performance metric comprises employing a gradient descent optimization method.

3. The method of claim 2, wherein employing the gradient descent comprises replacing a cost step function corresponding to the gradient descent optimization method with a sigmoid function, an exponential function, a linear transform, or combinations thereof.

4. The method of claim 2, wherein employing the gradient descent optimization method comprises training and evaluating the gradient descent optimization method by dividing a plurality of received reference images into a training set and a testing set with a non-overlapped object identity.

5. The method of claim 1, wherein optimizing the identified performance metric for determining the optimal subspace corresponding to the object identification task comprises:
  identifying an initial subspace by employing a subspace learning algorithm;
  iteratively varying the identified performance metric to determine the corresponding optimized performance metric; and
  optimizing the initial subspace to determine the optimal subspace based on the optimized performance metric.

6. The method of claim 1, wherein optimizing the identified performance metric for determining the optimal subspace corresponding to the object verification task comprises:
  identifying an initial subspace by employing a subspace learning algorithm;
  determining an optimal threshold based on the identified performance metric;
  iteratively varying the identified performance metric to determine the corresponding optimized performance metric; and
  optimizing the initial subspace to determine the optimal subspace based on the optimized performance metric and the optimal threshold.

7. The method of claim 6, wherein determining the optimal threshold comprises employing a gradient descent optimization method.

8. The method of claim 7, wherein determining the optimal threshold further comprises sorting a plurality of distance scores to identify the optimal threshold that minimizes a verification error on a receiver operating characteristic (ROC) curve in a determined time period.

9. The method of claim 1, wherein the performance metric comprises a false alarm rate, a false rejection rate, an identification rate, a weighted sum of the false alarm rate and the false rejection rate, or combinations thereof.

10. The method of claim 9, wherein identifying the performance metric comprises assigning a first weight corresponding to the false alarm rate and a second weight corresponding to the false rejection rate based on a desired application requirement or a desired user requirement to generate the weighted sum of the false alarm rate and the false rejection rate.

11. The method of claim 9, wherein optimizing the identified performance metric corresponding to the object identification task is based on the weighted sum of the false alarm rate and the false rejection rate and a total count of received reference images.

12. The method of claim 9, wherein optimizing the identified performance metric corresponding to the object identification task is based on an approximation of an M-ary orthogonal signal demodulation function.

13. The method of claim 1, wherein the object comprises a person, apparel, luggage, merchandise, an animal, a biometric parameter, a vehicle, or combinations thereof.

14. The method of claim 13, wherein the biometric parameter comprises a face, an iris, an ear, a fingerprint, a voice identifier, or combinations thereof.

15. A system for object recognition, comprising:
  an image capture device for acquiring at least one image of an object; and
  a computing device communicatively coupled to the image capture device, wherein the computing device:
    receives at least one image of an object and at least one reference image;
    identifies at least one performance metric corresponding to an object recognition task, wherein the object recognition task comprises an object verification task, an object identification task, or a combination thereof;

optimizes the identified performance metric to generate the corresponding optimized performance metric by determining an optimal subspace based on a determined objective function corresponding to the object recognition task and a difference between the received image and the corresponding reference image, wherein optimizing the identified performance metric for determining the optimal subspace corresponding to one or more of the object verification task and the object identification task comprises:

identifying an initial subspace by employing a subspace learning algorithm;

iteratively varying the identified performance metric to determine the corresponding optimized performance metric; and optimizing the initial subspace to determine the optimal subspace based on the optimized performance metric; and compares the received image with the reference image based on the optimized performance metric for performing the object recognition task.

16. The system of claim 15, further comprising a data repository for storing the at least one acquired image, the performance metric corresponding to the object recognition task, and the reference image.

17. The system of claim 16, wherein the image capture device comprises a scanner, a camera, an image sensor, or a webcam.

18. A screening system, comprising:

an image acquisition device for acquiring at least one image corresponding to an object;

an object recognition unit communicatively coupled to the image acquisition device for:

receiving at least one image of an object and at least one reference image;

identifying at least one performance metric corresponding to an object recognition task, wherein the object recognition task comprises an object verification task, an object identification task, or a combination thereof; and optimizing the identified performance metric to generate the corresponding optimized performance metric by determining an optimal subspace based on a determined objective function corresponding to the object recognition task and a difference between the received image and the corresponding reference image, wherein optimizing the identified performance metric for determining the optimal subspace corresponding to one or more of the object verification task and the object identification task comprises:

identifying an initial subspace by employing a subspace learning algorithm;

iteratively varying the identified performance metric to determine the corresponding optimized performance metric; and optimizing the initial subspace to determine the optimal subspace based on the optimized performance metric; and an image processor communicatively coupled to the image acquisition device and the object recognition unit for comparing the received image with the reference image based on the optimized performance metric for performing the object recognition task.

19. The screening system of claim 18, wherein the image acquisition system comprises a scanner, a camera, an image sensor, or a webcam.

20. The screening system of claim 18, further comprising a data repository configured to store the at least one acquired image, the performance metric corresponding to the object recognition task, and the reference image.

21. A non-transitory computer readable storage medium that stores instructions executable by one or more processors to perform a method for optimizing face recognition:

acquiring at least one image of an object and at least one reference image;

identifying at least one performance metric corresponding to an object recognition task using a computing device, wherein the object recognition task comprises an object verification task, an object identification task, or a combination thereof;

optimizing the identified performance metric to generate the corresponding optimized performance metric by determining an optimal subspace based on a determined objective function corresponding to the object recognition task and a difference between the received image and the corresponding reference image, wherein optimizing the identified performance metric for determining the optimal subspace corresponding to one or more of the object verification task and the object identification task comprises:

identifying an initial subspace by employing a subspace learning algorithm;

iteratively varying the identified performance metric to determine the corresponding optimized performance metric; and optimizing the initial subspace to determine the optimal subspace based on the optimized performance metric; and comparing the received image with the reference image based on the optimized performance metric for performing the object recognition task using the computing device.

22. A computerized method for optimizing object recognition, comprising:

receiving at least one image of an object and at least one reference image;

identifying at least one performance metric corresponding to an object recognition task using a computing device;

optimizing the identified performance metrics to generate the corresponding optimized performance metric for determining an optimal subspace based on a gradient descent optimization method and a difference between the at least one received image and the corresponding reference image, wherein a cost step function corresponding to the gradient descent optimization method is replaced with a sigmoid function, an exponential function, a linear transform, or a combination thereof; and comparing the received image with the reference image based on the optimized performance metric for performing the object recognition task using the computing device.

* * * * *

UNITED STATES PATENT AND TRADEMARK OFFICE
CERTIFICATE OF CORRECTION

PATENT NO. : 8,498,454 B2
APPLICATION NO. : 12/627039
DATED : July 30, 2013
INVENTOR(S) : Tu et al.

It is certified that error appears in the above-identified patent and that said Letters Patent is hereby corrected as shown below:

In the Specification:

In Column 3, Line 44, delete "DRAWINGS" and
insert -- BRIEF DESCRIPTION OF DRAWINGS --, therefor.

In Column 8, Line 47, in Equation (7),
delete "$\{h(x,y)|y \in G^C\} < \min\{h(x,z)|z \in G^{\neg C}\}$" and
insert -- $\{h(x,y) \mid y \in G^C\} < \min\{h(x,z) \mid z \in G^{\neg C}\}$ --, therefor.

In Column 8, Line 63, in Equation (8), delete "$dx \sim \int_{-\infty}^{\infty} p(h \mid 1)\left(\int_h^{\infty} p(g \mid 0)\,dg\right)^{C-1} dh =$" and
insert -- $dx \sim \int_{-\infty}^{\infty} p(h \mid 1)\left(\int_h^{\infty} p(g \mid 0)\,dg\right)^{C-1} dh \sim$ --, therefor.

In Column 9, Line 6, delete "#0," and insert -- $\neq 0$, --, therefor.

In Column 10, Line 10, in Equation (11), delete "$F(u) \to \prod(u)$" and
insert -- $f(u) \to \prod(u)$ --, therefor.

In Column 11, Line 48, delete "hT" and insert -- $h_T$ --, therefor.

Signed and Sealed this
Eighth Day of October, 2013

Teresa Stanek Rea
*Deputy Director of the United States Patent and Trademark Office*

CERTIFICATE OF CORRECTION (continued)
U.S. Pat. No. 8,498,454 B2

In Column 13, Line 3, delete "of a suitable" and insert -- of σ suitable --, therefor.

In the Claims:

In Column 16, Line 57, in Claim 14, delete "fmgerprint," and insert -- fingerprint, --, therefor.